United States Patent [19]

Keathley et al.

[11] 3,774,807
[45] Nov. 27, 1973

[54] GAS-GENERATING VALVE
[75] Inventors: Donald P. Keathley, Honeybrook; John T. M. Lee, Phoenixville, both of Pa.
[73] Assignee: ICI American Incorporated, Wilmington, Del.
[22] Filed: June 8, 1971
[21] Appl. No.: 151,071

[52] U.S. Cl. .................................. 222/3, 222/5
[51] Int. Cl. ............................................. B67b 7/24
[58] Field of Search ............... 222/3, 5, 492, 541; 9/316–320, 324, 325; 141/4; 280/150 AB

[56] References Cited
UNITED STATES PATENTS
3,649,045   3/1972   Smith et al. ............... 280/150 AB
3,117,424   1/1964   Hebenstreit ........................ 222/3
3,437,245   4/1969   Herbert et al. ............... 222/541 X
2,959,326   11/1960  Pouliot ............................. 222/5

Primary Examiner—Robert B. Reeves
Assistant Examiner—John P. Shannon
Attorney—Kenneth E. Mulford and Roger R. Horton

[57] ABSTRACT

A gas-generating valve for releasing a pressurized fluid from a container and releasing a gas into the fluid from a gas generator after the fluid has been released. This is accomplished by opening an outlet port on the container, preferably by the action of a piston moving relative to a casing. Gas from the gas generator is then released into the fluid, again preferably by the movement of the piston.

5 Claims, 5 Drawing Figures

INVENTOR
Donald P. Keathley
John T. M. Lee
ATTORNEY

INVENTORS
Donald P. Keathley
John T. M. Lee
BY *Richard D. Fuerle*
ATTORNEY

GAS-GENERATING VALVE

The inflatable air bag is a new safety device for protecting automobile passengers in a collision. When the automobile strikes something or is struck by something, a sensor detects the change in motion and closes a switch. This fires a detonator which releases gas under high pressure from a bottle into a folded bag. The bag expands in front of the driver or passenger and prevents him from striking the dashboard. See U. S. Pat. No. 3,485,973.

We have invented a gas-generating valve for releasing the gas from the bottle into a conduit going to the air bag, although, of course, it may be used for other purposes. Our valve includes a gas generator which adds to the amount of gas released. However, the gas generator does not significantly increase the pressure of the gas in the bottle since gas from the gas generator cannot be released into the bottle until the valve is open. This is a safety feature of great importance since an accidental release of gas from the gas generator before the valve has opened would increase the pressure in the bottle and might shatter it.

In our valve, a container (usually a bottle, but it may be a pipeline, etc.) holds a fluid (generally a gas) under pressure. The container has an outlet port which is closed by a removable port seal. The port seal is opened by some means, preferably by the action of a piston moving relative to a casing. Either the piston or the casing, whichever is moving relative to the port seal, is connected to the port seal and opens the outlet port. The piston or casing is preferably made to move by the action of an explosive charge, although the gas generator itself or a mechanical or other means may also be used. After the port seal is opened, the gas from the gas generator is released into the fluid. This is preferably accomplished by the movement of the piston or casing, whichever is moving relative to the gas generator.

This invention may be readily understood from the accompanying drawings.

Figure 1:
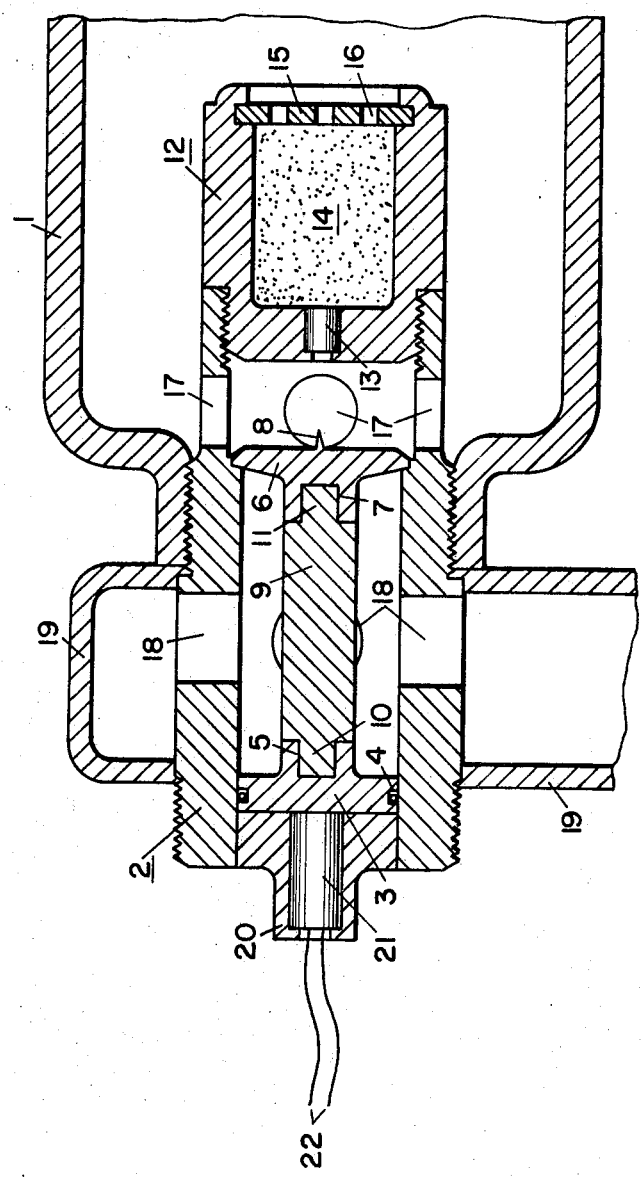
FIG. 1 is a cross-sectional side view of a certain presently preferred embodiment of this invention.

In FIG. 1, a bottle 1 contains a gas under high pressure. The bottle is threaded onto casing 2 which contains piston 3 having an optional O-ring seal 4 and a well 5. The casing also contains port seal 6 which has a well 7 and firing pin 8. Rod 9 has pins 10 and 11 which removably fit into wells 5 and 7, respectively. This construction prevents gas flowing through the valve from closing the valve, since gas striking piston 3 will move the piston to the left without moving port seal 6 because rod 9 will drop out of wells 5, 7, or both.

Casing 2 is threaded to gas generator 12 which has a percussion cap 13, a gas generating composition 14, and a plate 15 having numerous apertures 16 therethrough. Casing 2 is provided with four ports 17 (three shown) and four ports 18 (three shown). A pipe 19 sealed at one end encloses ports 18. At the end of the casing opposite the gas generator is a plug 20 containing a squib 21 having legwires 22.

The valve of FIG. 1 is operated by sending a current through legwires 22 which initiates squib 21. The resulting explosion moves piston 3 to the right until port seal 6 strikes gas generator 12. Gas in bottle 1 will immediately flow through ports 17, casing 2, out ports 18, and down pipe 19.

When port seal 6 strikes gas generator 12, pin 8 also strikes percussion cap 13 firing it and initiating gas generating composition 14. The gas produced flows through apertures 16 to join the gas in the bottle flowing into pipe 19. Gas generating compositions may be single base, double base, composite, or other suitable compositions.

Figure 2:
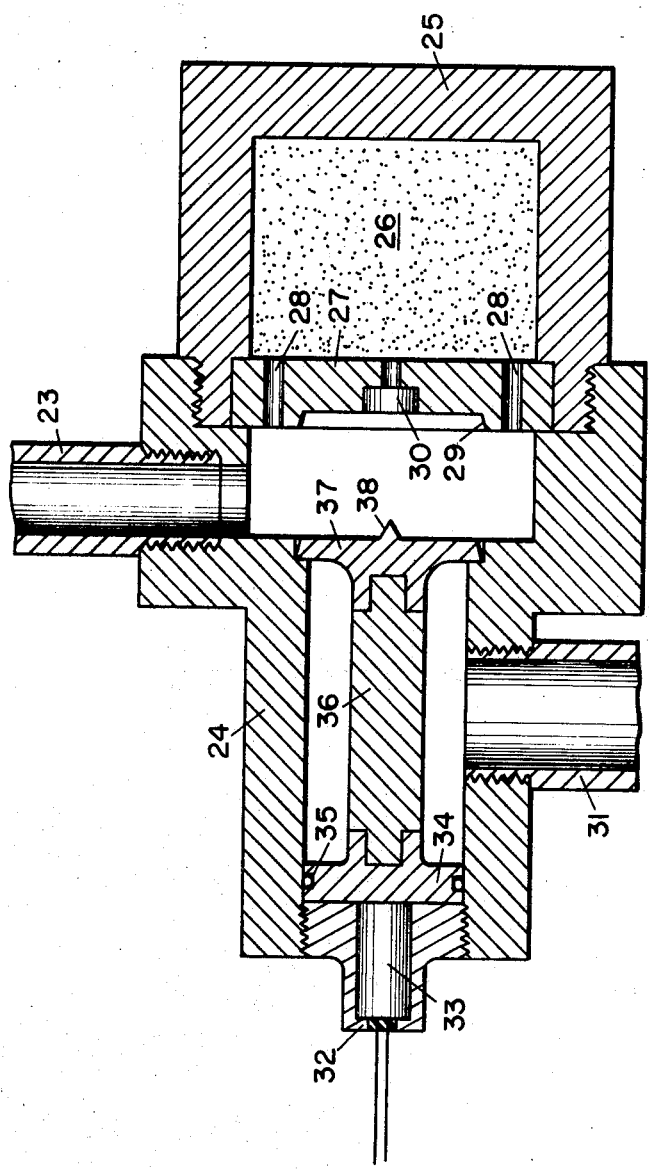
FIG. 2 is a cross-sectional side view of a modified valve of the general type of the valve of FIG. 1.

In FIG. 2, pipe 23 is threaded into casing 24 and leads to a bottle (not shown) containing a gas under high pressure. Also threaded into casing 24 is a cap 25 containing a gas generating composition 26. A plate 27 has numerous apertures 28 therethrough and a recessed portion 29 and holds percussion cap 30. Also threaded into casing 24 is a second pipe 31 which leads to the air bag and a plug 32 which holds electrically actuated squib 33. As in FIG. 1, inside casing 24 is a piston 34 having an O-ring 35, a rod 36, and port seal 37 having a firing pin 38.

The valve operates in a manner similar to the valve of FIG. 1. Squib 33 is fired sending piston 34 to the right which permits the gas in the bottle to begin to exit through pipe 31. Firing pin 38 then strikes percussion cap 30 and gas generator 26 begins burning, sending additional gas out apertures 28 and pipe 31.

Figure 3:
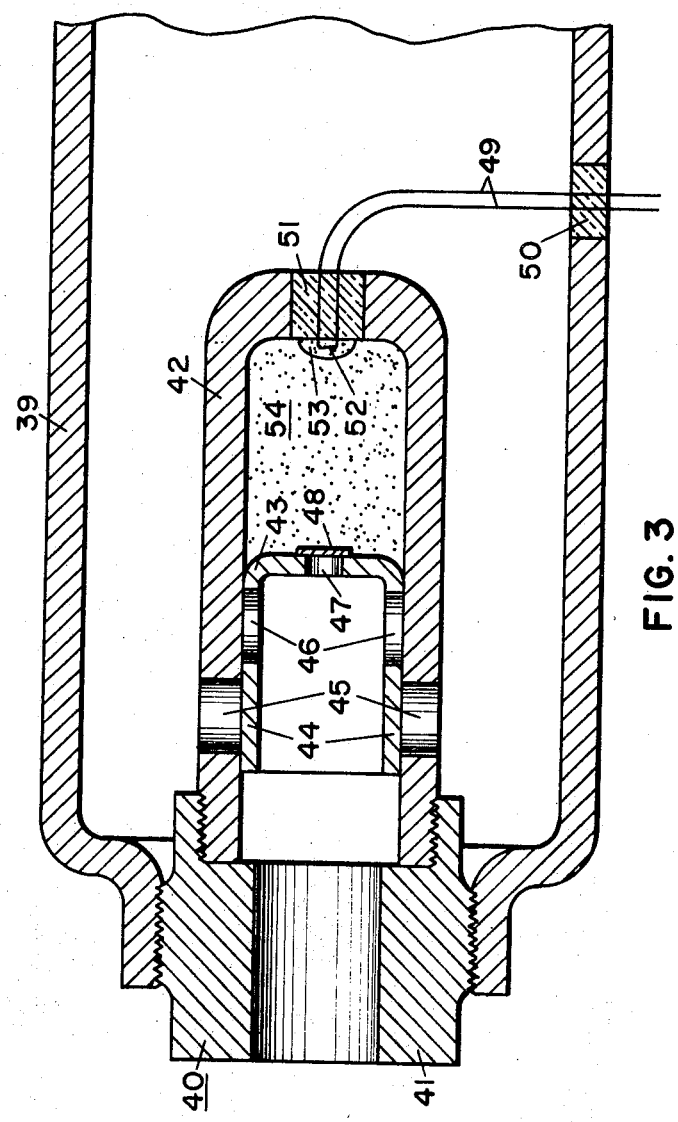
FIG. 3 is a cross-sectional side view of another valve according to this invention.

In FIG. 3, a metal bottle 39 containing a gas under pressure is threaded onto casing 40 which is comprised of end portion 41 threaded to cup portion 42. Cup portion 42 contains piston 43, a portion 44 of which acts as a port seal for four ports 45 (two shown) in cup portion 42. Piston 43 has four ports 46 (two shown) and a single port 47 which is covered by sealing disc 48. Wires 49 pass through glass seal 50 in bottle 39 and glass seal 51 in cup portion 42. They are joined by bridgewire 52 which is coated with an ignition composition 53 which ignites gas generating composition 54.

Figure 4:
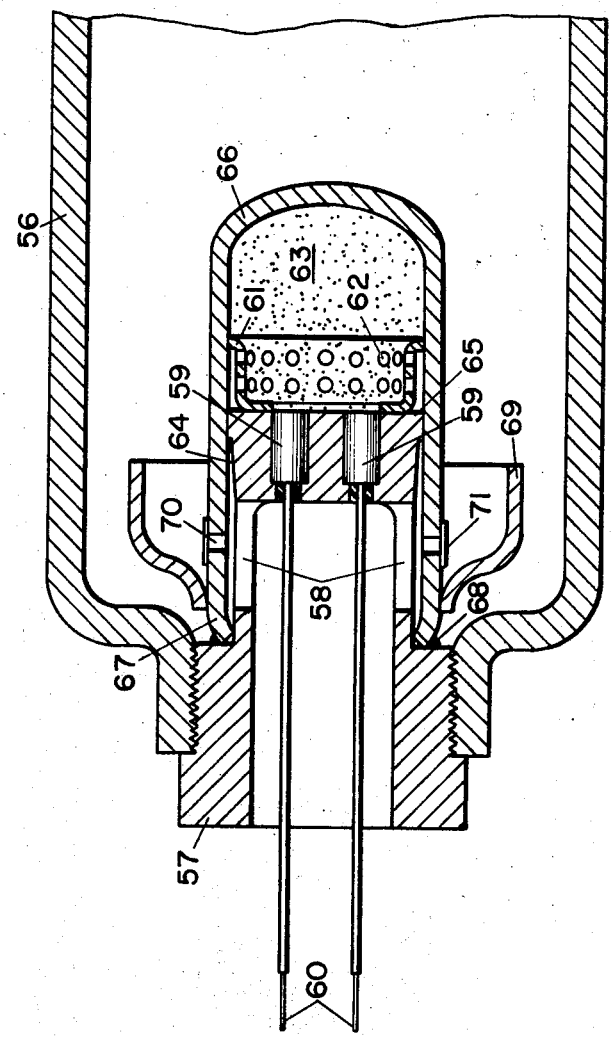
FIG. 4 is a cross-sectional side view of a further valve according to this invention.

The valve of FIG. 3 is operated by sending an electrical current through wires 49 thereby igniting ignition composition 53 and gas generating composition 54. The resulting gas pressure moves piston 43 to the left until it strikes end portion 40. This causes ports 45 and 46 to align releasing the gas in bottle 39. The gas pressure from the gas generating composition continues to increase until sealing disc 48 is ruptured, permitting the gas to escape.

in FIG. 4, a bottle 56 contains a gas under pressure and is threaded onto piston 57 having four ports 58 (two shown). The piston holds two squibs 59, each having a legwire 60. A CUP 61 having numerous apertures 62 and holding a gas generating composition 69 is welded to the top of the piston. The outside of the piston has a sloping portion 64 and a stop 65. A casing 66 is fitted over the piston, crimped at 67, and sealed with solder or other sealing material at 68. Casing 66 has deflector 69 welded to it and contains numerous apertures 70, each covered with a sealing disc 71.

The valve of FIG. 4 is operated by sending a current through either or both wires 60 and piston 57. This fires at least one of the squibs (two are provided for redundancy) and initiates gas producing composition 63.

When the gas pressure from the gas producing composition has reached a certain level, seal 68 is broken and casing 66 moves to the right. When crimp 67 reaches port 58, the gas in the bottle passes through the port and out through conduits which lead to the air bag. Then aperture 70 passes stop 65 permitting gas from the gas producing composition to break off sealing discs 71 and pass out the aperture 70. The gas then strikes deflector 69 which is provided to deflect the gas from ports 58 until it has mixed with the gas in the bottle and cooled somewhat. The gas then joins the gas in the bottle in passing out ports 58. When crimp 67 reaches sloping portion 64, the moving casing is slowed and is finally stopped when crimp 67 strikes stop 65. The sloping portion is provided to prevent a sudden shock which might let the casing come off the piston.

Figure 5:
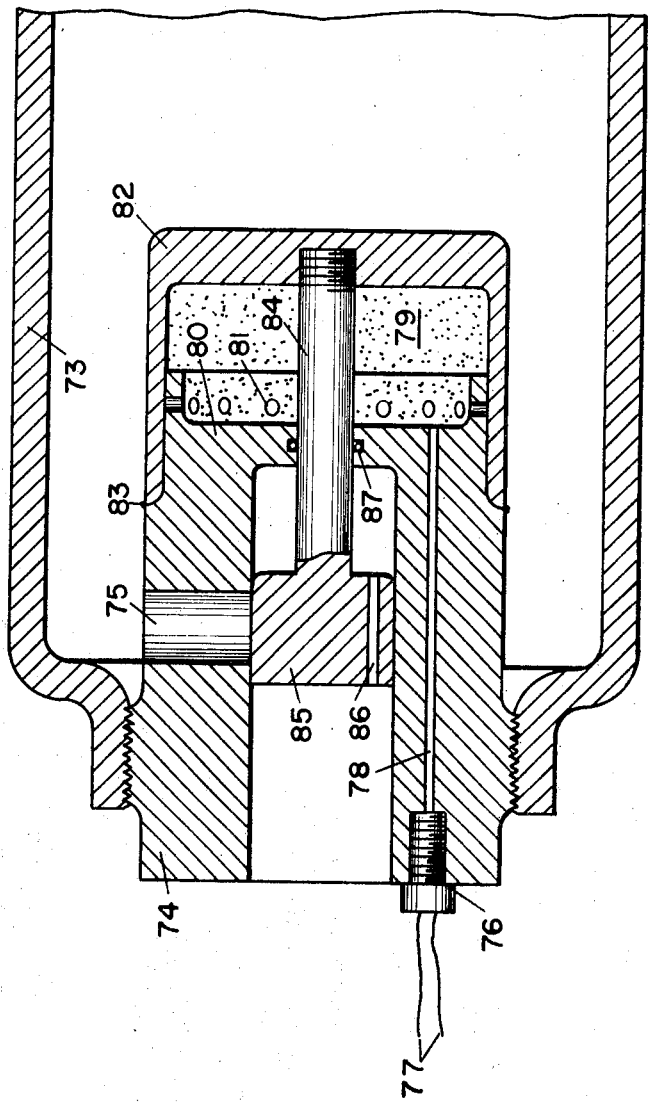
FIG. 5 is a cross-sectional side view of still another valve according to this invention.

In FIG. 5, a bottle 73 containing a gas under pressure is threaded onto piston 74. Piston 74 has port 75 and holds squib 76 having legwires 77. Channel 78 leads from squib 76 to gas producing composition 79 which is contained in a cup portion 80 having numerous apertures 81. A casing 82 fits over the piston and is sealed with solder or the like at 83. A rod 84 having an enlarged portion 85 is threaded into casing 82. The enlarged portion 85 has a duct 86 passing through it. An O-ring 87 seals the rod to the piston.

The valve of FIG. 5 is operated by sending a current through legwires 77 which fires squib 76. A flame shoots up channel 78 initiating gas producing composition 79. When the gas pressure has increased sufficiently, seal 83 is broken and casing 82 and rod 84 together move to the right. As soon as enlarged portion 85 has moved to port 75, the gas in the bottle begins to flow out the port into conduits leading to the air bag. When enlarged portion 85 has almost completely passed port 75, casing 82 moves past apertures 81, thus permitting gas from the gas producing composition to join the gas in the bottle in passing out port 75. Enlarged portion 85 then strikes piston 74 preventing casing 82 from flying off piston 74. Duct 86 is provided to permit the escape of air between enlarged portion 85 and piston 74.

What is claimed is:

1. A gas generator, valve and fluid container arrangement comprising:
   a. a container capable of holding a gas under pressure;
   b. said container having an outlet port;
   c. a valve casing being movable relative to said outlet port;
   d. a stationary piston in sealed, slidable relation to said casing;
   e. a removable port seal closing said outlet port and removable in cooperation with the movement of said casing;
   f. means for moving said casing;
   g. means for releasing gas from said gas generator into said fluid container after moving said casing to remove said seal from said outlet port.

2. A gas generator, valve and fluid container arrangement comprising:
   a. a container capable of holding a gas under pressure;
   b. said container having an oulet port;
   c. a valve casing;
   d. a piston in sealed, slidable relation within said casing, said piston being a movable part relative to said outlet port;
   e. a removable port seal closing said outlet port and removable in cooperation with the movement of said piston;
   f. means for moving said piston; and
   g. means for releasing gas from said gas generator into said fluid container after moving said piston to remove said seal from said outlet port wherein said gas generator is inside said container adjacent said outlet port and said gas from said gas generator is released inside said container.

3. A gas generator, valve and fluid container arrangement comprising:
   a. a container capable of holding a gas under pressure;
   b. said container having an outlet port;
   c. a valve casing;
   d. a piston in sealed, slidable relation within said casing, said piston being a movable part relative to said outlet port;
   e. a removable port seal closing said outlet port and removable in cooperation with the movement of said piston;
   f. means for moving said piston; and
   g. means for releasing gas from said gas generator into said fluid container after moving said piston to remove said seal from said outlet port wherein said means for moving said movable part is gas from said gas generator.

4. A gas generator, valve and fluid container arrangement comprising:
   a. a container capable of holding a gas under pressure;
   b. said container having an outlet port;
   c. a valve casing;
   d. a piston in sealed, slidable relation within said casing, said piston being a movable part relative to said outlet port;
   e. a removable port seal closing said outlet port and removable in cooperation with the movement of said piston;
   f. means for moving said piston; and
   g. means for releasing gas from said gas generator into said fluid container after moving said piston to remove said seal from said outlet port wherein said port seal is a portion of said piston.

5. A gas generator, valve and fluid container arrangement comprising:
   a. a container capable of holding a gas under pressure;
   b. said container having an outlet port;
   c. a valve casing;
   d. a piston in sealed, slidable relation within said casing, said piston being a movable part relative to said outlet port;
   e. a removable port seal closing said outlet port and removable in cooperation with the movement of said piston;
   f. means for moving said piston; and
   g. means for releasing gas from said gas generator into said fluid container after moving said piston to remove said seal from said outlet port wherein said gas generator is in communication with a percussion primer and wherein said movable part of said port seal has a firing pin which aligns with said percussion primer.

* * * * *

PO-1050
(5/69)

UNITED STATES PATENT OFFICE
CERTIFICATE OF CORRECTION

Patent No. 3,774,807                Dated November 27, 1973

Inventor(s) Donald P. Keathley - John T. M. Lee

It is certified that error appears in the above-identified patent and that said Letters Patent are hereby corrected as shown below:

Column 1, line 61, "or both. 4" should read --or both.--

Signed and sealed this 3rd day of December 1974.

(SEAL)
Attest:

McCOY M. GIBSON JR.                C. MARSHALL DANN
Attesting Officer                  Commissioner of Patents